United States Patent [19]

Schlüter

[11] 4,326,227
[45] Apr. 20, 1982

[54] APPARATUS FOR RECORDING AND READING DATA FROM A MAGNETIC PLATE

[75] Inventor: Peter Schlüter, Landau, Fed. Rep. of Germany

[73] Assignee: Schlüter Electronic GmbH, Landau, Fed. Rep. of Germany

[21] Appl. No.: 121,640

[22] Filed: Feb. 14, 1980

[30] Foreign Application Priority Data

Feb. 15, 1979 [DE] Fed. Rep. of Germany ....... 2905836

[51] Int. Cl.³ .............................................. G11B 5/56
[52] U.S. Cl. ....................................... 360/99; 360/75; 360/109
[58] Field of Search .............................. 360/99, 97–98, 360/69–71, 75, 86, 109

[56] References Cited

U.S. PATENT DOCUMENTS 4,097,908 6/1978 Chou et al .......................... 360/109

*Primary Examiner*—John H. Wolff
*Attorney, Agent, or Firm*—Becker & Becker, Inc.

[57] ABSTRACT

An apparatus for recording and reading-out data from a circular, foil-like magnetic plate or floppy disc movably arranged in an exchangeable cassette. The magnetic plate is coupled upon a drive shaft of a running mechanism which rotates the magnetic plate past a writing or recording-reading head. Adjustment can be made to particular information tracks of the magnetic plate. Linear motors are used for driving the shaft of the magnetic plate and for driving the shaft of a screw spindle upon which the writing or recording-reading head is arranged. A feeler pin secured to a writing- or recording-reader head carriage advances along a track spring of the screw spindle radially of the magnetic plate. Rotation of the linear motors can be controlled for the movement of the writing- or recording-reading head carriage by an electronic circuit with the aid of a measuring device, including a measuring wire arranged in an equilateral triangle and electromagnetically cooperating with a magnetic pin for generation of voltage impulses. The time interval between passage of the magnetic pin over the first and second legs of the measuring wire can be measured in a control electronic system and the resulting value is used as a basis for the desired control of the movements of the magnetic plate and/or the writing- or recording-reading head carriage.

7 Claims, 5 Drawing Figures

APPARATUS FOR RECORDING AND READING DATA FROM A MAGNETIC PLATE

The present invention relates to an apparatus for recording and reading-out of data from a circular, foil-like magnetic plate (floppy disc) movably arranged in an exchangeable cassette. The magnetic plate has a centrally arranged perforation or opening coupled upon a drive shaft of a running or feeding mechanism which causes rotation of the magnetic plate, along which a writing- or recording-reading head is radially passed on a screw spindle. The reading head can be adjusted to predetermined information tracks or channels of the magnetic plate, whereby means are provided with which the recording-reading head is pressed onto the magnetic plate through slot-like openings on both sides of the cassette.

Such devices serve for recording or storing information converted into electrical impulses including, for example, speech or coding, for example for registration of messages from current consumers whereby current removal quantities and current removal times are recorded for delivery at predetermined tariff periods.

Such devices are known according to which the radial movement of the writing or recording-reading head is effected by a step-switch motor which intermittently can carry out the dividing of the magnetic plate into concentric tracks or channels corresponding to forward and rearward movements (Service Manual SA 400— Shugard Associates 1977). The disadvantage results therefrom that only discrete concentric individual tracks can be recorded and approached or entered and error adjustments resulting under these circumstances cannot be corrected; the disadvantage is eliminated by a screw spindle drive of the writing or recording-reading head as described in BASF-6101 Floppy Disk Drive Manual of BASF AG 1975. The writing or recording-reading head, in this connection, is moved radially of the magnetic plate upon a screw spindle driven by an electromotor. The contact spring, by means of which the spindle nut is pressed in one direction against the thread pitch, hinders or precludes therewith that by way of the play between the nut and a screw pitch or course having a relatively large rise, slope or gradient pitch or inclination, there results an undefined adjustment of the writing- or recording-reading head. With such an arrangement, a continuous movement and a control of every location of the magnetic plate and a track correction can be made possible. Additionally, in this manner, spiral tracks can be written or recorded and read.

This arrangement especially has the disadvantage that a recognition of the particular radial position of the writing- or recording-reading head is possible only indirectly by recording and transmitting the respective rotation of the drive motor of the screw spindle covered or to be covered by the sought adjustment of the writing- or recording-reading head. Furthermore, an error rate is provided or given by way of the start-up time and reaction time of the motor. The same is true, however, also for the usable drive of the magnetic plate by an electromotor.

A further disadvantage of the known devices found on the market is that they must be adjusted, which represents an additional high production complexity and an operational uncertainty as a consequence of the danger of being out of adjustment. Additionally, these devices require a very precise and accordingly complex manner of construction.

It is therefore an object of the present invention to make possible to exact access of the writing- or recording-reading head for every suitable location of the magnetic plate, and especially to directly measure the actual adjustment of the writing- or recording-reading head with the greatest possible accuracy in order to be able to thereby eliminate an adjustment of the device. An object furthermore is to reduce the starting-up times of the plate- and writing- or recording-reading head movements to such an extent that an immediate and exact control of both of these movements is made possible.

Furthermore, it is customary to press the magnetic plate against a counter-bearing of the plate drive shaft with a device supported on the housing in order to attain a positive connection between the plate and drive motor; consequently this device, stationary in the pressed-into-engagement position, must exert a considerable pressure upon the plate, which leads to frictional wear, especially in the shaft bearing, and leads to delay in the start-up of the plate. Therefore, a further object of the invention is to avoid such wear being encountered and to preclude the mentioned disturbances for an exact starting control of the plate and of the writing- or recording-reading head.

The devices of this type previously found on the market require a relatively foreign or alien construction by way of the arrangement of two motors, for instance a step-switch motor for the movement of the writing- or recording-reading head and an electromotor for the plate drive. With the arrangement of a single motor, the consequently necessary belt drive results in further inaccuracies with the transmitting of the position of the plate or of the writing- or recording-reading head. Furthermore, the previously known types of devices require a very high precision and the utilization of structural parts which are complex to produce, especially parts made of metal, so that the production and finishing are expensive. Accordingly, a further object of the invention is to make the apparatus as compact as possible and to save space in order to make possible the easy and simple installation thereof in other consumer devices.

Finally, it is an object of the present invention that the construction of the apparatus permit the utilization of synthetic material injection-molded or die-cast parts without any disadvantages effects by way of the large production or finishing and age tolerances, and in order to make possible therewith an inexpensive and simple production.

These and other objects and advantages of the present invention will appear more clearly from the following specification in connection with the accompanying drawings, in which.

Figure 1:
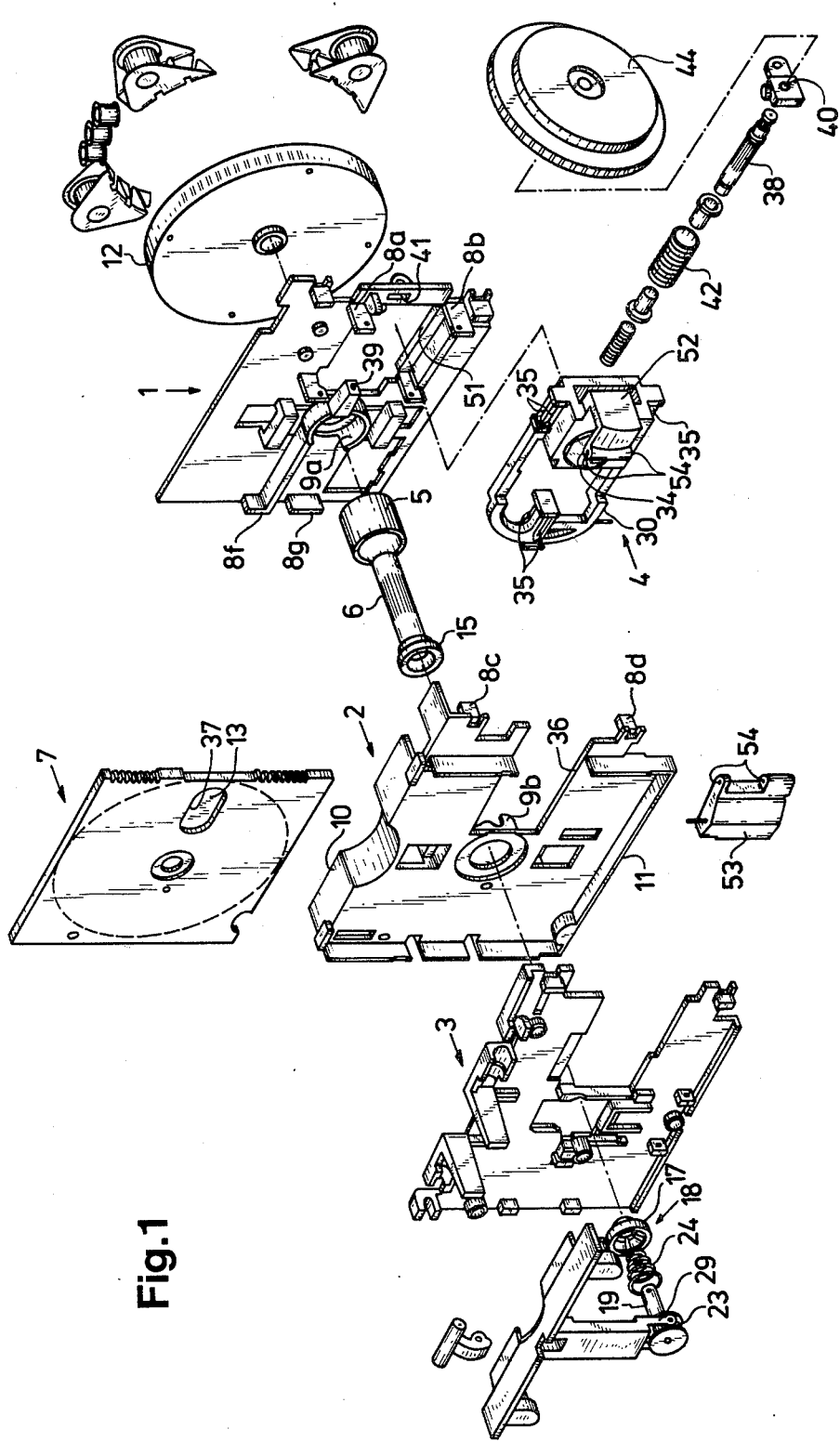
FIG. 1 is an exploded view of the inventive device.
Figure 2:
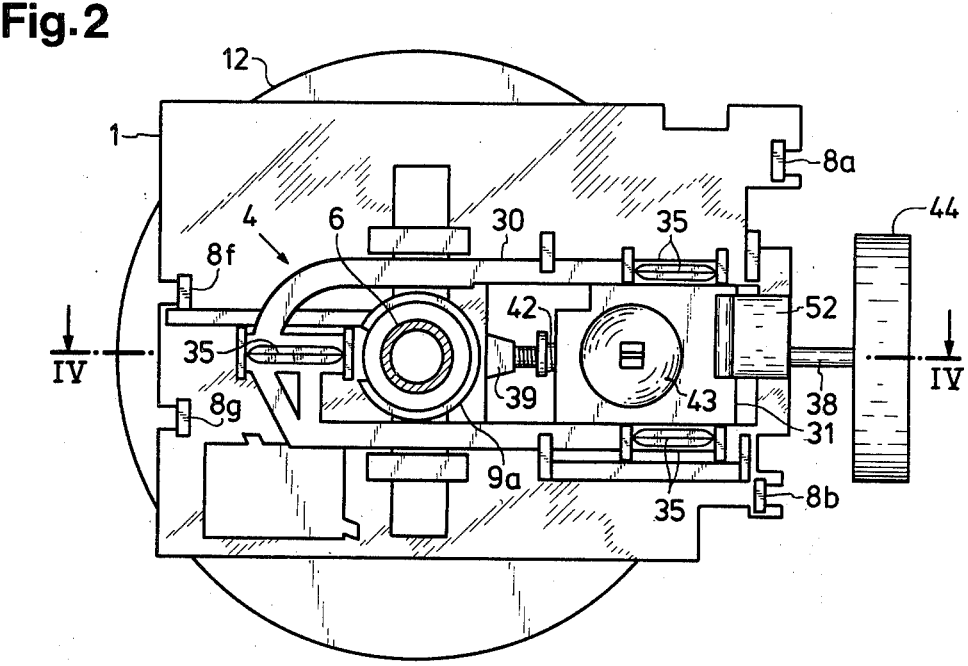
FIG. 2 is a partial radial section taken through the same device in the plane II—II of FIG. 4.
Figure 3:
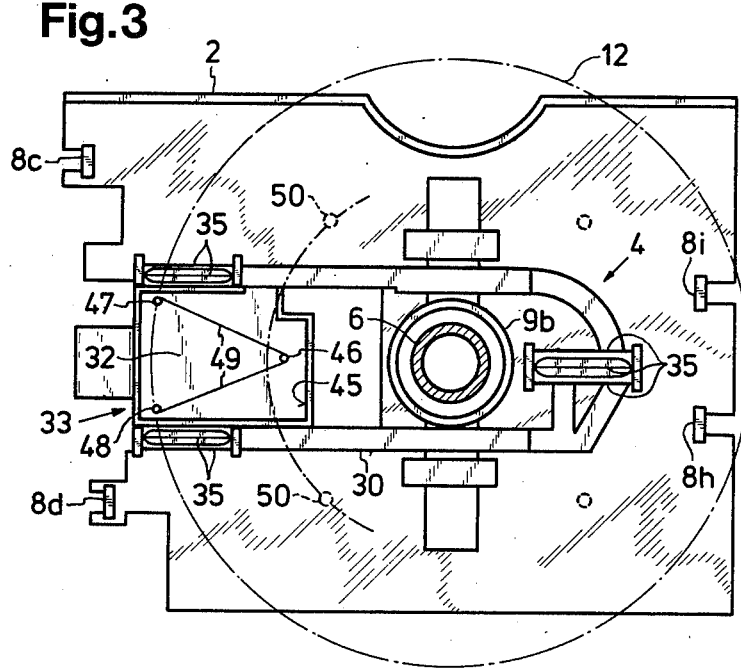
FIG. 3 is a partial radial section through the same device in the same plane as in FIG. 2 though represented by the line III—III in FIG. 4 and seen in a direction opposite to that for the view of FIG. 2.

The apparatus of the present invention is characterized primarily in that the motor for the drive of the shaft of the magnetic plate, and the motor for the drive of the shaft of the screw spinde, are linear motors, rather than electro-motors. By way of example, such a linear motor may be a rotating sector motor with a traveling field, utilizing groups of magnets. Furthermore, the screw spindle is a track spring wound spirally around its shaft and in which a feeler or detector pin fastened upon the writing- or recording-reading head carriage engages. The feeler pin advances the writing- or recording-reading head carriage radially of the magnetic plate along the track spring. The rotation of the linear motor for turning the magnetic plate, and of the linear motor for moving the writing- or recording-reading head carriage, are controlled by an electronic circuit with the aid of a measuring device; this device includes a measuring wire tensioned or spanning at an acute angle and arranged on the writing- or recording-reading head carriage in a plane parallel to the rotary plane of the linear motor for the magnetic plate movement. The bi-section of the angle of this measuring wire coincides with the direction of movement of the writing- or recording-reading head carriage. Furthermore, the ends of the legs or shanks of the measuring wire are connected with the control electronic means of the linear motors. The measuring wire cooperates electromagnetically with at least one magnetic pin which is arranged on the rotor of the linear motor for the magnetic plate in such a way that it is moved or passed close to the measuring wire and transverse to the bi-section of the angle of this measuring wire during rotation of the rotor of the linear motor for creating or generating a voltage impulse during every passage over one leg or shank of this measuring wire. The time interval between the passage of the magnetic pin over the first leg or shank, and the passage over the second leg or shank of the measuring wire, is measured in the control electronic means. The value obtained therefrom can be used as a basis for the desired control of the movements of the magnetic plate and the writing or recording-reading head carriage.

By this arrangement, there is attained that an extraordinarily accurate and fine adjustment of the writing or recording-reading head can occur with respect to the magnetic plate. A preliminary adjustment is not necessary; the device, moreover, can be adjusted by the control electronic means accuratey upon the desired track or channel, and the arrangement has a very compact manner of construction.

It is expedient that the corner points of the arrangement of the measuring wire form an equilateral triangle, the height of which equals the path length of the writing- or recording-reading head carriage from the outermost track to the innermost track of the magnetic plate.

The magnetic plate can be coupled with a plate holding device, on the drive shaft, capable of being securely clamped in the drive shaft for the magnetic plate, otherwise, however, freely movable. Consequently, there is avoided that the magnetic plate needs to be pressed from the housing with greater pressure during the movement thereof.

Additionally, the engagement head for pressing the writing- or recording-reading head against the magnetic plate expediently can be linked or journalled to the writing- or recording-reading head carriage, and can be magnetically pressed into engagement with different strength relative to the writing- or recording-reading head on the other side of the magnetic plate, according to the function of the device (writing, recording, reading or starting up). Consequently, there is avoided hereby that the engagement head is pressed into engagement with the same force uniformly by the spring effect for every function.

The present invention further provides that the writing- or recording-reading head carriage be journalled transverse to the direction of movement thereof with respect to the housing support parts upon longitudinal ball bearings or rollers in all degrees or axes of freedom. Consequently, every play of the writing- or recording-reading head carriage is precluded transverse to the direction of movement thereof, which is a precondition for the accuracy of the control thereof.

The housing support parts and the writing- or recording-reading head carriage can comprise synthetic material parts produced in a die-casting or injection method. Consequently, an inexpensive production and finishing are possible, as made feasible by the fact that the device is self-adjusting with every starting-up operation. Accordingly, precision metal structural parts can be eliminated.

Finally, it is expedient that the detector or feeler pin which engages in the track spring, be resilient, i.e. either in a self-resilient manner, or resiliently arranged, in order to be able to jump or spring over the individual windings of the track spring during a possible quick adjustment of the writing- or recording-reading head carriage.

Referring now to the drawings in detail, the inventive device, for purposes of facilitating understanding and recognition of the features, is illustrated only as to the essential parts thereof.

The reference numerals 1, 2 and 3 generally indicate the housing carrier parts which are synthetic material parts produced in a die-cast procedure. The housing carrier parts 1 and 2 together form the space or chamber in which the writing- or recording-reading head carriage 4 is guided and in which the bearing 5 of the plate drive shaft 6 is installed and accommodated. The housing carrier parts 2 and 3 together form the compartment for the magnetic plate cassette 7. The housing carrier parts 1 and 2 are connected by the spacers 8a through 8h, and by the bearing sleeve parts 9a and 9b, as well with the cover part 10 provided on the housing carrier part 2. The housing carrier parts 2 and 3 are connected with the side walls 11 provided on the part 2 in a partialy interrupted manner, and the housing carrier parts 2 and 3 leave open the upper side of the compartment formed accordingly for the insertion of the cassette.

Figure 5:
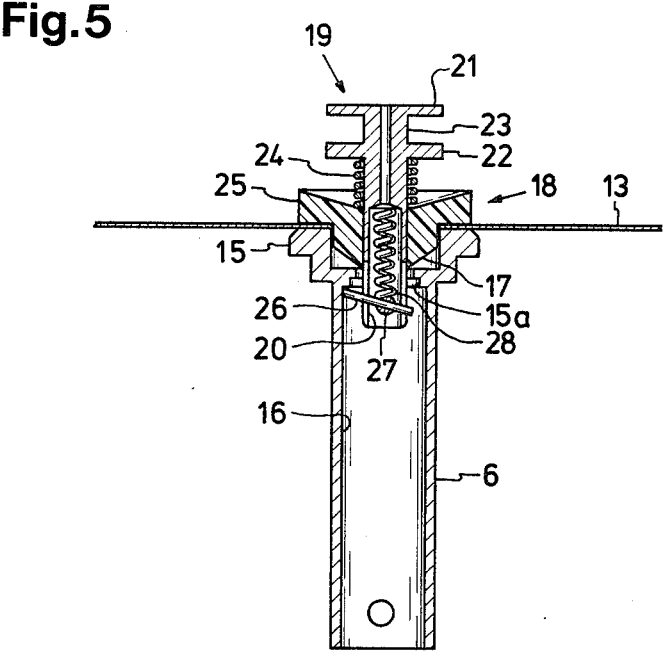
FIG. 5 is a partial axial section taken through the plate drive shaft of the same device in a scale 1:2 of enlargement compared with the preceding views of the drawings.
Figure 4:
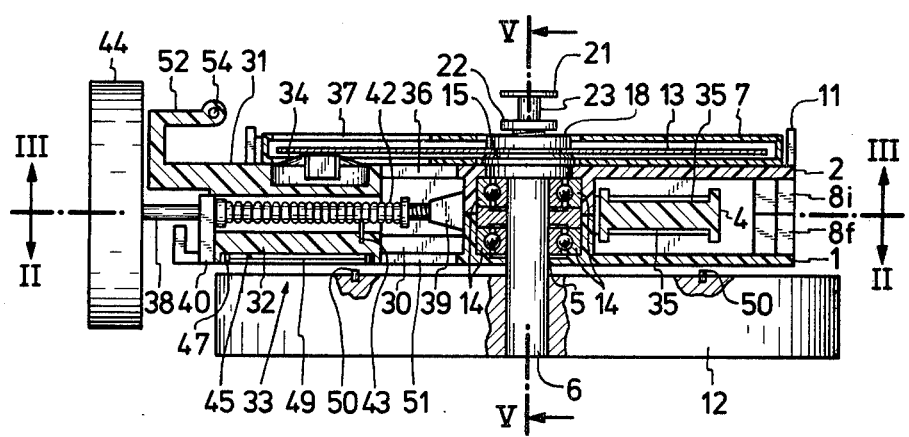
FIG. 4 shows an axial section taken through the same device in the plane IV—IV in FIG. 2.

The rotor of the schematically illustrated linear motor 12 is secured upon the shaft 6 and journalled in alignment for driving the magnetic plate 13 in the bearing 5 formed by the ball bearings 14 and carried by the bearing bushing parts 9a and 9b. The stator of the linear motor 12 is rigidly connected with the housing part 1 upon the outer side thereof. The shaft 6 has a collar 15 at the opposite end thereof with which the shaft 6 projects through the housing bearing part 2, and has a coaxial bore 16 which serves for receiving a centering cone 17 of the plate holder 18 (FIG. 5), as well as a two-step inner collar 15a toward the inside on the outer end of this bore.

The plate holder 18 comprises a pin 19 which has a coaxial bore 20 toward the shaft 6 and which on its other side has two disc-shaped round formations 21, 22 that define the limits of a recess or groove 23. The centering cone 17, made of durable plastic material, is shiftably seated around the pin 19. A spiral pressure or compression spring 24 is arranged around the pin 19 between the centering cone 17 and the bore 20. The spiral pressure spring 24 is effective to hold the magnetic plate 13 between a collar 25 of the plate holder 18 and the collar 15 of the shaft 6, and the magnetic plate 13 can be positively connected therewith.

The pin 19 projects beyond the centering cone 17 into the bore 16 of the shaft 6. The pin 19 is cut or notched from the shaft end thereof in such a way that a thorn, tongue, pin or spike 26 therein can project from the pin and can be swung or pivoted about a pivot axis 27 in a plane coaxial to the pin 19. A spiral pressure or compression spring 28 is located in the bore 20, and this spring 28 engages against the thorn or spike 26 and endeavors to adjust the spike or thorn 26 about its pivot axis 27 at right angles to the axis of the pin 19. If the pin 19 is shifted for pressing the centering cone 17 against the magnetic plate 13 against the collar 15 of the shaft 6, then the thorn or spike 26 latches or catches behind the inner collar 15a of the bore 16 against the effect of the spiral pressure spring 24. The magnetic plate 13 is then positively connected between the collar 25 of the plate holder 18 and the collar 15 of the shaft 6 by the effect of the spiral pressure or compression spring 24. The plate holder 18 can then rotate freely with the shaft and requires no further support or engagement against stationary parts for securely clamping the plate. The shifting in and out of the pin 19 in the shaft 6 is effected with the aid of an adjustment fork 29 which engages in the recess or groove 23 and is pivotally secured on the housing carrier part 3 (FIG. 1).

The connection of the magnetic plate 13 with the shaft 6 can be released thereby that upon the pin 19 by way of the adjustment fork 29 there is exerted a renewed pressure counter to the effect of the spiral pressure or compression spring 24. The thorn or spike 26 accordingly is released from its latching position and positions itself under the effect of the spiral spring 28 at right angles to the axis of the pin 19 and lies down during the withdrawal thereof rearwardly and no longer represents any hindrance therefor.

The writing- or recording-reading head carriage 4, shiftable transverse to the axis of the shaft 6, comprises a frame 30, a carrier plate 31 for the writing- or recording-reading head facing the housing carrier part 2 or, respectively, the magnetic plate 13, and a carrier plate 32 for the interval or spacing-measuring device 33. The writing- or recording-reading head 34 is provided in the carrier plate 31. The frame 30 of the writing- or recording-reading head carriage 4 runs upon ten grooved ball bearings 35 for each ball, which engages or rolls off against corresponding counter bearings provided on the housing carrier parts 1 and 2; the counter bearings, for the purpose of facilitating the illustrations, are not reproduced in the drawing. Consequently, a play-free journalling and an exact guidance of the writing- or recording-reading head is realized.

The writing- or recording-reading head 34 projects through a slot 36 in the housing carrier part 2 (FIG. 1) and the conventional slot 37 in the cassette 7 as far as to the magnetic plate 13.

The shaft 38 for shifting the writing- or recording-reading head carriage 4 extends at right angles to the axis of the shaft 6 through the intermediate space or chamber between the carrier plates 31 and 32. The inner end of the shaft 38 is journalled in the bearing 39 provided on the bearing bushing part 9a, and externally of the writing-recording-reading head carriage is journalled in the bearing 40, which is secured in the housing carrier part 1 in the opening 41.

A track spring 42 is wound up spirally in closest winding relationship with the shaft 38. The spring 42 serves as a screw spindle, into which a feeler or tracer point pin 43 engages that projects from the rear of the carrier plate 32 toward the shaft 38. The pin 43, and the writing- or recording-reading head carriage therewith, are shifted by the windings of the track spring 42 axially parallel to the shaft 38 by rotation of the shaft 38.

The shaft 38 for transporting the writing- or recording-reading head carriage is driven by a further linear motor 44, the rotor of which is journalled on the shaft 38 aligned externally of the bearing 40, and the stator of which is rigidly connected with the housing carrier parts 1 and 2.

The spacing-measurement device 33 is arranged in a recess or depression 45 in that side of the carrier plate 32 facing the housing carrier part 1. The measuring device 33 comprises a pin 46 which is a rearward extension of the feeler pin 43 and accordingly is arranged at right angles over the axis of the shaft 38; the spacing-measuring device 33 additionally comprises two further pins 47, 48 which are arranged in the outer corners of the recess or depression 45. The three pins 46, 47, 48 substantially form an equilateral triangle, the middle line of which is parallel with the axis of the shaft 38. A measuring wire 49 is tensioned or extends from pin 47 to pin 46, and from there to pin 48; the measuring wire 49 cooperates with one or more magnetic pins 50 arranged in an equi-angular spacing upon that side of the rotor of the linear motor 12 facing the housing carrier part 1; the magnetic pins 50 are so arranged that they traverse both branches of the measuring wire 49 in every position of the writing- or recording-reading head. The housing carrier part or plate 1, for this purpose, has a recess 51 (FIG. 1) into which the carrier plate 31 projects to make possible the closest possible passage over the magnetic pins 50, however, without coming into engagement therewith.

An arm 52 bent into a U-shape in the plane of the plate drive shaft 6 is located on that side of the writing- or recording-reading head carriage 4 facing the linear motor 44. An engagement head 53 is linked to the arm 52 in the hinges 54, and on the one hand serves for pressing the magnetic plate 13 against the writing- or recording-reading head 34, and on the other hand engages or runs up on the opposite side of the head 34 with a ground or cut ceramic part upon the other side of the magnetic plate. This engagement head 53 is controlled in conformity with the particular function, i.e. writing or recording, reading, or controlling or keeping on course, with differing pressure, and is pressed into engagement by a lever device against the magnetic plate 13 by a non-illustrated electromagnet.

The manner of operation of the linear motors is known. Linear motors can be precisely regulated or controlled at a desired speed. The control is effected in a non-illustrated electronic circuit arrangement.

An exact rotation of 360° of the shaft 38 is necessary to advance the writing- or recording-reading head carriage 4 with the writing- or recording-reading head 34 around a data track. As a result thereof, the wire strength or thickness of the tracking spring 42 corresponds exactly to the spacing from track to track. Voltage impulses are received by the linear motor 44 by way of the non-illustrated drive electronic system. With a corresponding sequence and polarization of the drive voltages, the rotor of the linear motor 44 can be moved stepwise in one direction or in the other direction. For example, 36×3=108 individual steps are necessary for each rotation. If the spacing from track to track is, for example, 0.5 mm, then with a collective number of steps of 108, there results mathematically a spacing between two steps of 0.5:108=0.004 mm, i.e. the writing- or recording-reading head can be adjusted on each track with an accuracy of 4μ. By providing the length measurement, which is the spacing measured between the middle point of the shaft 6 for the drive of the magnetic plate 13 and the writing- or recording-reading head, there is transmitted to the drive electronic system where the writing or recording-reading head is located at a particular time, or how may steps must be carried out to the right or to the left.

The manner of operation or effectiveness of the spacing-measuring device 33 is as follows: The ends of the measuring wire at the pins 47 and 48 are electrically connected with the electronic system. During operation, with rotation of the rotor of the linear motor 12, a magnetic pin 50 with a polar surface passes or runs with a nominal spacing over the magnetic wire arrangement 49 at an exactly known speed. With every passage or traversal over one of the wire connections between the pins 46–47 or 46–48, there is induced an electrical voltage which is evaluated in the electronic system. In accordance with the positioning of the writing- or recording-reading head carriage 4, there results a different path length of the magnetic pin 50 from one wire to another. The electrical evaluation is so undertaken that the path length difference of the writing- or recording-reading head carriage 4 is capable of being determined already at 1μ. The determined value is finally forwarded to the electronic system for further evaluation and working thereof. Preferably, the measuring wire 49 is so tensioned around the three pins 46, 47, 48 that the vertically measured spacing between the measuring wires, respectively at each point, is the same as the path covered by the carriage during horizontal movement. A subsequent conversion or recalculating of the actually covered path distance is avoided by this arrangement.

The advantages of the invention are the quick and very exact access possibilities, and the elimination of an adjustment of the device since the device adjusts automatically for each access with very high accuracy, because the electronic system, so to speak, always knows where the writing- or recording-reading head is located.

As a consequence of this self-adjustment, the parts of the carrier housing and the writing- or recording-reading head carriage can be made of synthetic material in a die-cast procedure, whereby finishing and aging tolerances can be disregarded or extensively omitted.

The freely movable plate holding additionally avoids the wear procedures otherwise arising during pressing of the plate into engagement; such wear procedures are very important.

For both latter reasons, there results a high aging durability and a long life of the device, which is especially meaningful for current-consuming measuring devices. All mentioned circumstances permit a very much more inexpensive manufacture than was the case with previous comparable devices.

In summary, the present invention comprises an apparatus for recording and reading-out data from a circular, foil-like magnetic plate (floppy disc) movably arranged in an interchangeable cassette. The magnetic plate includes a centrally arranged breakthrough coupled upon a drive shaft of a running mechanism that causes rotation of the magnetic plate, along which a writing- or recording-reading head is passed radially on a screw spindle. Adjustment of the reading head can be made to predetermined information tracks of the magnetic plate, and for this purpose, means are provided with which the writing- or recording-reading head is pressed against the magnetic plate through slot-like openings on both sides of the cassette. The present invention is particularly characterized in that the motor 12 for driving the shaft 6 of the magnetic plate 13, and the motor 44 for driving the shaft 38 of the screw spindle, are linear motors. The screw spindle is a track or tracer spring 42 wound spirally arounds its shaft; a feeler pin 43 fastened on the writing- or recording-reading head carriage 4 engages into the track spring 42. The feeler pin 43 advances the writing- or recording-reading head carriage 4 along the track spring 42 radially of the magnetic plate 13. The rotations of the linear motor 12 for turning the magnetic plate 13, and the rotations of the linear motor 44 for moving the writing- or recording-reading head carriage 4, are controlled by an electronic circuit with the aid of a measuring device; the measuring device comprises a measuring wire 49 tensioned in an acute angle and arranged on the writing-/recording-reading head carriage in a plane parallel to the turning plane of the linear motor 12 for the magnetic plate movement, whereby the bi-section of the angle of this measuring wire coincides with the direction of movement of the writing- or recording-reading head carriage. The ends of the legs of the measuring wire 49 are connected with the control electronic system of the linear motors 12 and 44. The measuring wire 49 cooperates electromagnetically with at least one magnetic pin 50 which is arranged on the rotor of the linear motor 12 for the magnetic plate 13 in such a way that it is passed close to the measuring wire 49 and transverse to the bi-section of the angle of this measuring wire during rotation of the rotor of the linear motor 12 for generating a voltage impulse during every passage over a leg of the measuring wire 49. The time interval between the passage of the magnetic pin 50 over the first leg, and the passage over the second leg of the measuring wire, can be measured in the control electronic system. The resulting value is used as a basis for the desired control of the movements of the magnetic plate 13 and/or the writing- or recording-reading head carriage 4.

The corner points of the arrangement of the measuring wire 49 may form an equilateral triangle, the height of which equals the path length of the writing- or recording-reading head carriage 4 from the outermost track to the innermost track of the magnetic plate 13.

The magnetic plate 13 can be coupled to the drive shaft 6 by a plate-holding device 17, 18 capable of being latched on the drive shaft 6 for the magnetic plate, but otherwise freely movable.

The engagement head 53, for pressing the writing- or recording-reading head 34 against the magnetic plate 13 may be linked or connected to the writing- or recording-reading head carriage 4 and may be magnetically pressed into engagement with differing strength against the writing or recording-reading head 34 on the other side of the magnetic plate 13 in accordance with the function of the device (writing or recording, reading, or controlling or keeping on course).

The writing- or recording-reading head carriage 4 journalled upon longitudinal ball bearings 35 can have all degrees of freedom transverse to the direction of movement thereof relative to the housing carrier parts 1, 2.

The housing carrier parts 1, 2 and 3, and the writing- or recording-reading head carriage 4 comprise synthetic material in a die-cast procedure.

The feeler pin 43 may be resilient.

The present invention is, of course, in no way limited to the specific disclosure of the specification and drawings, but also encompasses any modification within the scope of the appended claims.

What I claim is:

1. An apparatus for recording and reading-out data from a circular, foil-like magnetic plate, which is movably arranged in an interchangeable cassette having slot-like openings on both sides, and has a centrally arranged perforation, said apparatus comprising in combination:
    a first drive shaft on which said perforation of said magnetic plate is capable of being coupled in such a way as to bring about rotation of said magnetic plate;
    a first linear motor for driving said first drive shaft of said magnetic plate;
    a second drive shaft;
    a second linear motor for driving said second drive shaft;
    a screw spindle in the form of a track spring operatively connected with said second drive shaft;
    a recording-reading head carriage of synthetic material movably supported along said track spring;
    a recording-reading head held by said recording-reading head carriage;
    a feeler pin mounted on a carrier plate for engaging said track spring and advancing said recording-reading head carriage and said recording-reading head therealong radially of said magnetic plate;
    means mountable on said recording-reading head carriage for pressing said recording-reading head through said slot-like openings of said cassette against said magnetic tape for adjusting said recording-reading head to predetermined information tracks of said magnetic tape; and
    a measuring device which operates in conjunction with a control electronic circuit for controlling the rotations of said first linear motor for turning said magnetic plate, and the rotations of said second linear motor for moving said recording-reading head carriage, said measuring device including: a measuring wire tensioned in an acute angle and arranged on said recording-reading head carriage in a plane parallel to the turning plane of said first linear motor, the bisection of the angle of said measuring wire coinciding with the direction of movement of said recording-reading head carriage, the ends of the legs of said angle-forming measuring wire being connected with said control electronic system; and at least one magnetic pin operatively arranged on said first linear motor, said measuring wire electromagnetically cooperating with said at least one magnetic pin in such a way that the latter is capable of being passed close to said measuring wire transverse to the bisection of the angle of said measuring wire during rotation of said first linear motor for generating a voltage impulse during every passage over a leg of said measuring wire, the time interval between the passage of said at least one magnetic pin over the first leg of said measuring wire, and passage over the second leg of said measuring wire being capable of being measured in said control electronic system, with the resulting value being used as a basis for the desired control of the movements of said magnetic plate and said recording-reading head carriage of synthetic material by an exact access of said recording-reading head for every suitable location of the magnetic plate directly to measure exact adjustment of said recording-reading head with greatest possible accuracy without adjustment of the device regardless of finishing and age tolerances of said recording-reading head carriage of synthetic material.

2. An apparatus in combination according to claim 1, in which the corner points of said angle-forming measuring wire arrangement form a substantially equilateral triangle, the height of which equals the path length of said recording-reading head carriage from the outermost to the innermost track of said magnetic plate.

3. An apparatus in combination according to claim 2, which includes a plate-holding device, which is capable of being latched to said first drive shaft though otherwise being freely movable, for effecting coupling of said magnetic plate to said first drive shaft.

4. An apparatus in combination to claim 3, in which said means for pressing said recording-reading head against said magnetic plate comprises an engagement head linked to said recording-reading head carriage, said engagement head being magnetically pressable with differing strengths against said recording-reading head on the other side of said magnetic plate in conformity with the function of said apparatus, i.e., recording, reading, and controlling.

5. An apparatus in combination according to claim 4, which includes housing carrier parts of synthetic material and longitudinal ball bearings in said recording-reading head carriage for journalling the latter in all degrees of freedom transverse to the direction of movement thereof relative to said carrier parts.

6. An apparatus in combination according to claim 5, in which said housing carrier parts and said recording-reading head carriage both of synthetic material being capable of being produced in a die-cast procedure.

7. An apparatus in combination according to claim 6, in which said feeler pin is resilient.

* * * * *